US009863454B2

(12) United States Patent
Morris et al.

(10) Patent No.: US 9,863,454 B2
(45) Date of Patent: Jan. 9, 2018

(54) ALIGNMENT SYSTEM FOR PROVIDING PRECISE ALIGNMENT AND RETENTION OF COMPONENTS OF A SEALABLE COMPARTMENT

(71) Applicant: GM Global Technology Operations LLC, Detroit, MI (US)

(72) Inventors: Steven E. Morris, Fair Haven, MI (US); Christopher J. Georgi, Rochester Hills, MI (US); Jennifer P. Lawall, Waterford, MI (US); Gordan N. Noll, St. Clair Shores, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/104,333

(22) Filed: Dec. 12, 2013

(65) Prior Publication Data

US 2015/0043959 A1 Feb. 12, 2015

Related U.S. Application Data

(60) Provisional application No. 61/863,175, filed on Aug. 7, 2013.

(51) Int. Cl.
 *B23P 19/04* (2006.01)
 *B23P 19/10* (2006.01)
 (Continued)

(52) U.S. Cl.
 CPC .............. *F16B 17/00* (2013.01); *B60K 15/05* (2013.01); *B60L 11/1809* (2013.01);
 (Continued)

(58) Field of Classification Search
 CPC ..... B25B 27/00; B25B 27/14; B25B 27/0035; B23P 11/00; B23P 19/10; B62D 27/04
 (Continued)

(56) References Cited

U.S. PATENT DOCUMENTS 419,358 A 1/1890 Raymond et al.
1,219,398 A 3/1917 Huntsman
(Continued)

FOREIGN PATENT DOCUMENTS

BE 842302 A 9/1976
CN 1032581 A 4/1989
(Continued)

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

(Continued)

*Primary Examiner* — Glenn Dayoan
*Assistant Examiner* — Sunsurraye Westbrook
(74) *Attorney, Agent, or Firm* — Cantor Colburn LLP (57) ABSTRACT

An elastically averaging alignment and retention system for a sealable compartment includes a first component and a second component. The first component includes a first alignment member and an elastically deformable alignment element fixedly disposed with respect to the first alignment member, the elastically deformable alignment element having an elongated hollow tube. The second component includes a second alignment member and an alignment feature fixedly disposed with respect to the second alignment member, the alignment feature having a blind-end pocket. The elastically deformable alignment element is configured and disposed to interferingly, deformably and matingly engage the alignment feature. Portions of the elastically deformable alignment element when inserted into the alignment feature elastically deform to an elastically averaged final configuration that aligns the first component (Continued)

relative to the second component in at least two of four planar orthogonal directions.

15 Claims, 5 Drawing Sheets

(51) Int. Cl.
| | | |
|---|---|---|
| *F16B 17/00* | (2006.01) | |
| *B60L 11/18* | (2006.01) | |
| *B60K 15/05* | (2006.01) | |
| *B60R 11/00* | (2006.01) | |
| *F16B 5/06* | (2006.01) | |

(52) U.S. Cl.
CPC ............ *B60R 11/00* (2013.01); *F16B 5/0664* (2013.01); *B60K 2015/053* (2013.01); *B60K 2015/0553* (2013.01); *F16B 5/065* (2013.01); *Y10T 403/1624* (2015.01)

(58) Field of Classification Search
USPC ............ 296/97.22, 97.23, 29; 29/428, 407.1, 29/505, 451; 220/211, 263, 262, 375
See application file for complete search history.

(56) References Cited

U.S. PATENT DOCUMENTS

| | | |
|---|---|---|
| 1,261,036 A | 4/1918 | Kerns |
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,058,319 A | 10/1936 | Jones |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata et al. |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,580,628 A | 5/1971 | Rantala |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,838,928 A | 10/1974 | Blaurock et al. |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,895,408 A | 7/1975 | Leingang |
| 3,897,967 A | 8/1975 | Barenyl |
| 3,905,570 A | 9/1975 | Nieuwveld |
| 3,962,766 A | 6/1976 | Pompidor et al. |
| 3,967,351 A | 7/1976 | Rosenberg et al. |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A | 5/1981 | Delattre |
| 4,286,894 A | 9/1981 | Rongley |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,479,737 A | 10/1984 | Bergh et al. |
| 4,481,160 A | 11/1984 | Bree |
| 4,527,760 A | 7/1985 | Salacuse |
| 4,564,232 A | 1/1986 | Fujimori et al. |
| 4,575,060 A | 3/1986 | Kitagawa |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,715,095 A | 12/1987 | Takahashi |
| 4,745,656 A | 5/1988 | Revlett |
| 4,767,647 A | 8/1988 | Bree |
| 4,778,282 A | 10/1988 | Borchardt et al. |
| 4,805,272 A | 2/1989 | Yamaguchi |
| 4,807,335 A | 2/1989 | Candea |
| 4,817,999 A | 4/1989 | Drew |
| 4,819,309 A | 4/1989 | Behymer |
| 4,819,983 A | 4/1989 | Alexander et al. |
| 4,828,423 A | 5/1989 | Cramer, Jr. et al. |
| 4,843,976 A | 7/1989 | Pigott et al. |
| 4,881,764 A | 11/1989 | Takahashi et al. |
| 4,907,582 A | 3/1990 | Meyerrose |
| 4,917,426 A | 4/1990 | Copp |
| 4,973,212 A | 11/1990 | Jacobs |
| 4,977,648 A | 12/1990 | Eckerud |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |

(56) References Cited

U.S. PATENT DOCUMENTS

| | | |
|---|---|---|
| 5,165,749 A | 11/1992 | Sheppard |
| 5,170,985 A | 12/1992 | Killworth et al. |
| 5,178,433 A | 1/1993 | Wagner |
| 5,186,517 A | 2/1993 | Gilmore et al. |
| 5,208,507 A | 5/1993 | Jung |
| 5,234,122 A * | 8/1993 | Cherng .......................... 220/211 |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A * | 6/1996 | Skudlarek ..................... 220/262 |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | Demaagd |
| 5,577,779 A | 11/1996 | Dangel |
| 5,580,204 A | 12/1996 | Hultman |
| 5,593,265 A | 1/1997 | Kizer |
| 5,601,453 A | 2/1997 | Horchler |
| 5,634,757 A | 6/1997 | Schanz |
| 5,639,140 A | 6/1997 | Labrash |
| 5,657,893 A | 8/1997 | Hitchings |
| 5,666,749 A | 9/1997 | Waters |
| 5,667,271 A | 9/1997 | Booth |
| 5,670,013 A | 9/1997 | Huang et al. |
| 5,671,696 A | 9/1997 | Liethen |
| 5,698,276 A | 12/1997 | Mirabitur |
| 5,702,779 A | 12/1997 | Siebelink, Jr. et al. |
| 5,704,753 A | 1/1998 | Ueno |
| 5,706,559 A | 1/1998 | Oliver |
| 5,736,221 A | 4/1998 | Hardigg et al. |
| 5,765,942 A | 6/1998 | Shiral et al. |
| 5,795,118 A | 8/1998 | Osada et al. |
| 5,797,714 A | 8/1998 | Oddenino |
| 5,799,930 A | 9/1998 | Iivillett |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,865,500 A | 2/1999 | Sanada et al. |
| 5,931,514 A | 3/1999 | Chung |
| 5,915,678 A | 6/1999 | Slocum et al. |
| 5,920,200 A | 7/1999 | Pendse |
| 5,929,382 A | 7/1999 | Moore |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,036,198 A | 3/2000 | Kramer |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,142,509 A | 11/2000 | White, Jr. et al. |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,213,677 B1 | 4/2001 | Yamane et al. |
| 6,237,344 B1 | 5/2001 | Lee |
| 6,254,304 B1 | 7/2001 | Takizawa et al. |
| 6,264,869 B1 | 7/2001 | Notarpietro et al. |
| 6,283,540 B1 | 9/2001 | Siebelink, Jr. et al. |
| 6,286,214 B1 | 9/2001 | Bean |
| 6,289,560 B1 | 9/2001 | Guyot |
| 6,299,478 B1 | 10/2001 | Jones et al. |
| 6,311,960 B1 | 11/2001 | Pierman et al. |
| 6,318,585 B1 | 11/2001 | Asagiri |
| 6,321,495 B1 | 11/2001 | Oami |
| 6,336,767 B1 | 1/2002 | Nordquist et al. |
| 6,349,904 B1 | 2/2002 | Polad |
| 6,354,574 B1 | 3/2002 | Oliver et al. |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,478,102 B1 | 11/2002 | Puterbaugh |
| 6,484,370 B2 | 11/2002 | Kanie et al. |
| 6,485,241 B1 | 11/2002 | Oxford |
| 6,345,420 B1 | 12/2002 | Nabeshima |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,594,861 B2 | 7/2003 | Dimig et al. |
| 6,609,717 B2 | 8/2003 | Hinson |
| 6,637,095 B2 | 10/2003 | Stumpf et al. |
| 6,645,033 B1 | 11/2003 | Thomsen |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,846,125 B2 | 1/2005 | Smith et al. |
| 6,857,676 B2 | 2/2005 | Kawaguchi et al. |
| 6,857,809 B2 | 2/2005 | Granata |
| 6,872,053 B2 | 3/2005 | Bucher |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,073,260 B2 | 7/2006 | Jensen |
| 7,089,998 B2 | 8/2006 | Crook |
| 7,121,611 B2 | 10/2006 | Hirotani et al. |
| 7,144,183 B2 | 12/2006 | Lian et al. |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | Dicesare |
| 7,275,772 B2 | 10/2007 | Lee |
| 7,306,418 B2 | 12/2007 | Kornblum |
| 7,322,500 B2 | 1/2008 | Maierholzner |
| 7,344,056 B2 | 3/2008 | Shelmon et al. |
| 7,435,031 B2 | 10/2008 | Granata |

(56) References Cited

U.S. PATENT DOCUMENTS

| | | |
|---|---|---|
| 7,454,105 B2 | 11/2008 | Yi |
| 7,487,884 B2 | 2/2009 | Kim |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,610,671 B2 | 11/2009 | Watkins et al. |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | P Ham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |
| 7,883,137 B2 * | 2/2011 | Bar .................. 296/97.22 |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 7,959,214 B2 | 6/2011 | Salhoff |
| 7,971,913 B2 | 7/2011 | Sunahara et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 * | 4/2012 | Gurtatowski et al. ..... 296/97.22 |
| 8,187,369 B2 | 5/2012 | Rogers |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 * | 9/2012 | Cerruti et al. ................ 68/17 R |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,328,250 B2 | 12/2012 | Botten et al. |
| 8,371,789 B2 | 2/2013 | Takita |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,520,404 B2 | 8/2013 | Hamaguchi |
| 8,572,818 B2 | 11/2013 | Hofmann |
| 8,579,141 B2 | 11/2013 | Tejima |
| 8,371,788 B2 | 12/2013 | Lange |
| 8,607,952 B2 | 12/2013 | Keating et al. |
| 8,619,504 B2 | 12/2013 | Wyssbrod |
| 8,648,264 B2 | 2/2014 | Masumoto |
| 8,656,563 B2 | 2/2014 | Hiramatsu et al. |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,756,787 B2 | 6/2014 | Zimmermann et al. |
| 8,811,004 B2 | 8/2014 | Liu |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,038,335 B1 | 5/2015 | Eck |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 9,302,569 B2 | 4/2016 | Ogino et al. |
| 9,303,667 B2 | 4/2016 | Morris et al. |
| 2001/0016986 A1 | 8/2001 | Bean |
| 2001/0030414 A1 | 10/2001 | Yokota |
| 2001/0045757 A1 | 11/2001 | Hideki et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0107202 A1 | 6/2003 | Tajima et al. |
| 2003/0108401 A1 | 6/2003 | Agha et al. |
| 2003/0180122 A1 | 9/2003 | Dobson |
| 2004/0016116 A1 | 1/2004 | Yeh et al. |
| 2004/0028503 A1 | 2/2004 | Charles |
| 2004/0037637 A1 | 2/2004 | Lian et al. |
| 2004/0052574 A1 | 3/2004 | Grubb |
| 2004/0083583 A1 | 5/2004 | Bradley |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0191123 A1 | 9/2005 | Wertz |
| 2005/0208375 A1 | 9/2005 | Sakurai |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0249520 A1 | 11/2006 | Demonte |
| 2006/0264076 A1 | 11/2006 | Chen |
| 2007/0040411 A1 | 2/2007 | Dauvergne |
| 2007/0051572 A1 | 3/2007 | Beri |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0034636 A1 | 12/2007 | Fukuo |
| 2007/0292205 A1 | 12/2007 | Duval |
| 2008/0014508 A1 | 1/2008 | Van Doren et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260454 A1 | 10/2008 | Girodo et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |

(56) References Cited

U.S. PATENT DOCUMENTS

| | | |
|---|---|---|
| 2009/0117319 A1 | 5/2009 | Hubert |
| 2009/0126168 A1 | 5/2009 | Kobe et al. |
| 2009/0134652 A1 | 5/2009 | Araki |
| 2009/0140112 A1 | 6/2009 | Carnevali |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0318069 A1 | 12/2009 | Konet |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Shoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0103884 A1 | 5/2011 | Shiomoto et al. |
| 2011/0119875 A1 | 5/2011 | Iwasaki |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0194895 A1 | 8/2011 | Lai |
| 2011/0207024 A1 | 8/2011 | Bogumil et al. |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0157578 A1 | 6/2014 | Morris |
| 2014/0172112 A1 | 6/2014 | Marter |
| 2014/0175774 A1 | 6/2014 | Kansteiner |
| 2014/0199116 A1 | 6/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0260041 A1 | 9/2014 | Peck |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0050068 A1 | 2/2015 | Morris et al. |
| 2015/0063943 A1 | 3/2015 | Morris |
| 2015/0069779 A1 | 3/2015 | Morris et al. |
| 2015/0078805 A1 | 3/2015 | Morris et al. |
| 2015/0093177 A1 | 4/2015 | Morris |
| 2015/0093178 A1 | 4/2015 | Morris |
| 2015/0098748 A1 | 4/2015 | Morris et al. |
| 2015/0135509 A1 | 5/2015 | Morris et al. |
| 2015/0164184 A1 | 6/2015 | Morris et al. |
| 2015/0165986 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175219 A1 | 6/2015 | Kiester |
| 2015/0192160 A1 | 7/2015 | Gong |
| 2015/0232130 A1 | 8/2015 | Colombo |
| 2015/0274217 A1 | 10/2015 | Colombo |
| 2015/0308534 A1 | 10/2015 | Smith et al. |
| 2015/0308538 A1 | 10/2015 | Morris et al. |
| 2015/0353028 A1 | 12/2015 | Courtin et al. |
| 2015/0375798 A1 | 12/2015 | Morris et al. |
| 2016/0200268 A1 | 7/2016 | Morris et al. |

FOREIGN PATENT DOCUMENTS

| | | |
|---|---|---|
| CN | 1036250 A | 10/1989 |
| CN | 1129162 A | 8/1996 |
| CN | 2285844 Y | 7/1998 |
| CN | 1205285 A | 1/1999 |
| CN | 1204744 A | 7/1999 |
| CN | 2458785 Y | 11/2001 |
| CN | 1328521 A | 12/2001 |
| CN | 1336843 A | 2/2002 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 2874103 Y | 2/2007 |
| CN | 1933747 A | 3/2007 |
| CN | 2888807 Y | 4/2007 |
| CN | 2915389 Y | 6/2007 |
| CN | 101002030 A | 7/2007 |
| CN | 101005741 A | 7/2007 |
| CN | 200941716 Y | 8/2007 |
| CN | 200957794 Y | 10/2007 |
| CN | 101250964 A | 8/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 101701595 A | 5/2010 |

(56) References Cited

FOREIGN PATENT DOCUMENTS

| | | |
|---|---|---|
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 102463882 A | 5/2012 |
| CN | 102540855 A | 7/2012 |
| CN | 202561269 U | 11/2012 |
| CN | 102817892 A | 12/2012 |
| CN | 202686206 U | 1/2013 |
| CN | 202764872 U | 3/2013 |
| CN | 202987018 U | 6/2013 |
| CN | 103206595 A | 7/2013 |
| CN | 103206596 A | 7/2013 |
| CN | 203189459 U | 9/2013 |
| CN | 203344856 U | 12/2013 |
| CN | 103591102 A | 2/2014 |
| CN | 104100609 A | 10/2014 |
| CN | 203991175 U | 12/2014 |
| DE | 1220673 B | 7/1966 |
| DE | 2527023 A1 | 12/1976 |
| DE | 2736012 A1 | 2/1978 |
| DE | 2703897 A1 | 8/1978 |
| DE | 2809746 A1 | 9/1979 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10003852 A1 | 8/2001 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102010026218 A1 | 1/2012 |
| DE | 102011050003 A1 | 10/2012 |
| DE | 102012212101 B3 | 7/2013 |
| DE | 102013003028 A1 | 3/2014 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| GB | 2496613 A | 6/2013 |
| JP | H0861318 A | 3/1996 |
| JP | H08200420 A | 8/1996 |
| JP | H0942233 A | 2/1997 |
| JP | 2000010514 A | 1/2000 |
| JP | 2000192924 A | 7/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2010266519 A | 11/2010 |
| JP | 2012060791 A | 3/2012 |
| JP | 2012112533 A | 6/2012 |
| JP | 2012126421 A | 7/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 2001032454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2011089650 A1 | 7/2011 |
| WO | 2013088447 A1 | 6/2013 |
| WO | 2013191622 A1 | 12/2013 |
| WO | 2014119366 A1 | 8/2014 |

OTHER PUBLICATIONS

"Coupling Types—Elastic Averaging." Mit. Aug. 3, 2012, [online], [retrieved on Nov. 12, 2014]. Retrieved from the Internet <URL:https://web.archive.org/web/20120308055935/http://pergatory.mitedu/kinematiccouplings/html/about/elastic_averaging.html>.

"Elastic Averaging in Flexure Mechanisms: A Multi-Beam Parallelaogram Flexure Case-Study" by Shorya Awtar and EDIP Sevincer, Proceedings of IDETC/CIE 2006, Paper DETC2006-99752, American Society of Mechanical Engineers (ASME), Sep. 2006.

"Passive Alignment of Micro-Fluidic Chips Using the Principle of Elastic Averaging" by Sitanshu Gurung, Thesis, Louisiana State University, Dept. of Mechanical Engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

"The Design of High Precision Parallel Mechanisms Using Binary Actuation and Elastic Averaging: With Application to MRI Cancer Treatment" by L.M. Devita, J.S. Plante, and S. Dubowsky, 12th IFToMM World Congress (France), Jun. 2007.

Cross-sectional view of a prior art infrared welded assembly of BMW, Munich, Germany. Believed on the market since about Jan. 1, 2010, 1 page.

Final Office Action, dated Mar. 2, 2015, M090075US2.

Chinese Office Action for Application No. 201410385692.6 dated Dec. 2, 2015; pgs. 5.

Rojas, F.E., et al., "Kinematic Coupling for Precision Fixturing & Assembly" MIT Precision Engineering Research Group, Apr. 2013; 24 pgs.

Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.

(56) References Cited

OTHER PUBLICATIONS

Willoughby, P., "Elastically Averaged Precision Alignment", Degree of Doctor of Philosophy in Mechanical Engineering Dissertation, Massachusetts Institute of Technology, 2005; 158pgs.
Office Action for Chinese Patent Application for Invention No. 201410385692.6 dated Aug. 3, 2016 is related to U.S. Appl. No. 14/104,333; 6 pages.

\* cited by examiner

ALIGNMENT SYSTEM FOR PROVIDING PRECISE ALIGNMENT AND RETENTION OF COMPONENTS OF A SEALABLE COMPARTMENT

CROSS-REFERENCE TO RELATED APPLICATIONS

This patent application claims priority to U.S. Provisional Patent Application Ser. No. 61/863,175 filed Aug. 7, 2013, which is incorporated herein by reference in its entirety.

FIELD OF THE INVENTION

The subject invention relates to the art of alignment systems, and more particularly to an elastically averaged alignment system, and even more particularly to an elastically averaging alignment system providing two-way and/or four-way alignment of mating components for a sealable compartment on which the alignment and retention system is incorporated.

BACKGROUND

Currently, components, particularly vehicular components such as those found in automotive vehicles, which are to be mated together in a manufacturing process are mutually located with respect to each other by alignment features that are oversized and/or undersized to provide spacing to freely move the components relative to one another to align them without creating an interference therebetween that would hinder the manufacturing process. One example includes two-way and/or four-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. In the case where these misaligned components are also part of another assembly, such misalignments can also affect the function and/or aesthetic appearance of the entire assembly. Regardless of whether such misalignment is limited to two components or an entire assembly, it can negatively affect function and result in a perception of poor quality. Furthermore, the current retention features, such as clips, for example, may have a loose and/or poor fit, and may inadvertently be deformed prior to install if overstressed, resulting in the parts not being held properly in place, particularly if the parts are removed and replaced during servicing.

To align and seal components to form a sealed compartment, the aforementioned male and female alignment features may be employed in combination with a rubber material formed by a two-shot molding process to seal any openings formed by holes or slots. However, use of such a two-shot molding process adds complexity and time to the manufacture of the part.

Accordingly, the art of alignment systems can be enhanced by providing an alignment system or mechanism that can ensure precise two-way and/or four-way alignment of mating components via elastic averaging of a single elastically deformable alignment element disposed in mating engagement with a corresponding single alignment feature that is absent any through holes, thereby permitting the mating components to provide a sealed compartment absent the need for a potting compound.

SUMMARY OF THE INVENTION

In an exemplary embodiment of the invention an elastically averaging alignment and retention system for a sealable compartment includes a first component and a second component. The first component includes a first alignment member and an elastically deformable alignment element fixedly disposed with respect to the first alignment member, the elastically deformable alignment element having an elongated hollow tube. The second component includes a second alignment member and an alignment feature fixedly disposed with respect to the second alignment member, the alignment feature having a blind-end pocket. The elastically deformable alignment element is configured and disposed to interferingly, deformably and matingly engage the alignment feature. Portions of the elastically deformable alignment element when inserted into the alignment feature elastically deform to an elastically averaged final configuration that aligns the first component relative to the second component in at least two of four planar orthogonal directions.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. For example, the embodiments shown comprise vehicle components but the alignment system may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. Patent Publication 2013/0019455, the disclosure of which is incorporated by reference herein in its entirety. The embodiments disclosed above provide the ability to convert an existing component that is not compatible with the above-described elastic averaging principles, or that would be further aided with the inclusion of a two-way or four-way elastic averaging system for a sealable compartment as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Figure 1:
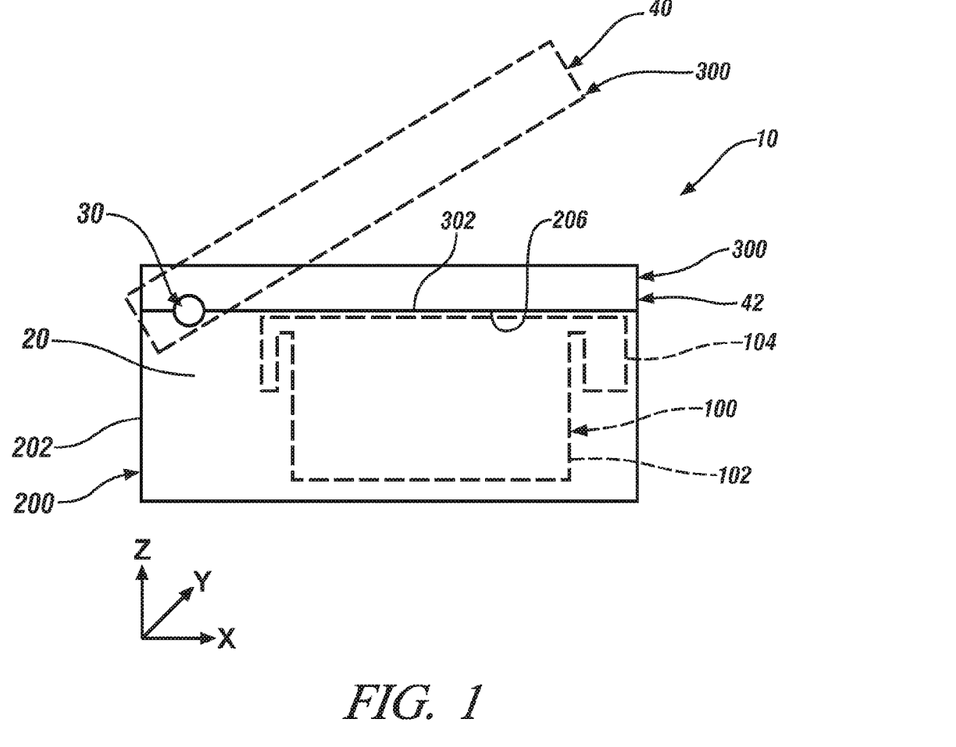
FIG. 1 depicts in block schematic form a side view of an elastically averaging alignment and retention system for a sealable compartment, in accordance with an embodiment of the invention.
Figure 2:
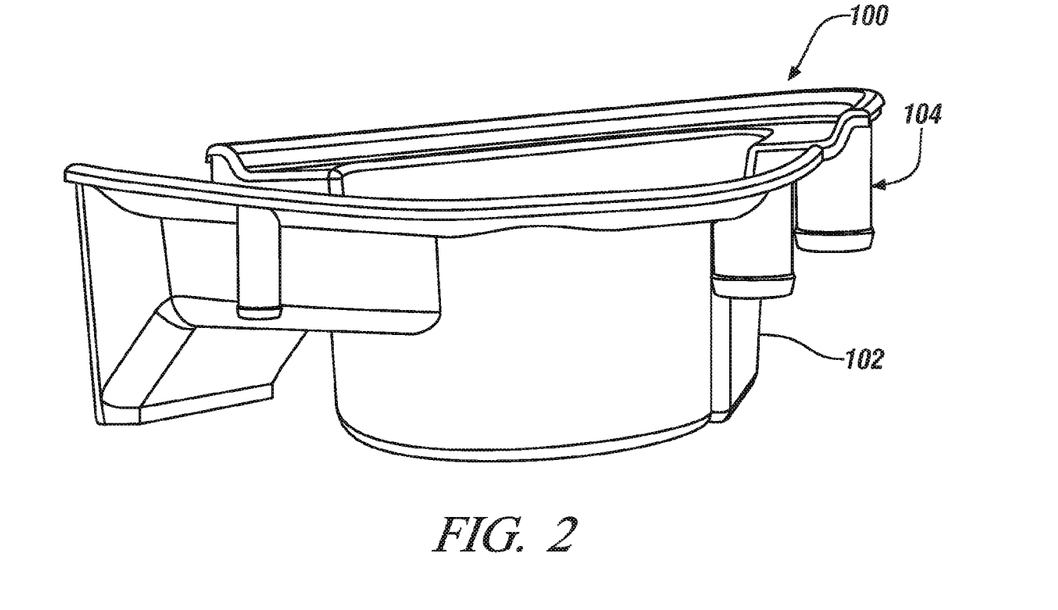
FIG. 2 depicts a side perspective view of a first component of the system of FIG. 1, in accordance with an embodiment of the invention.
Figure 3:
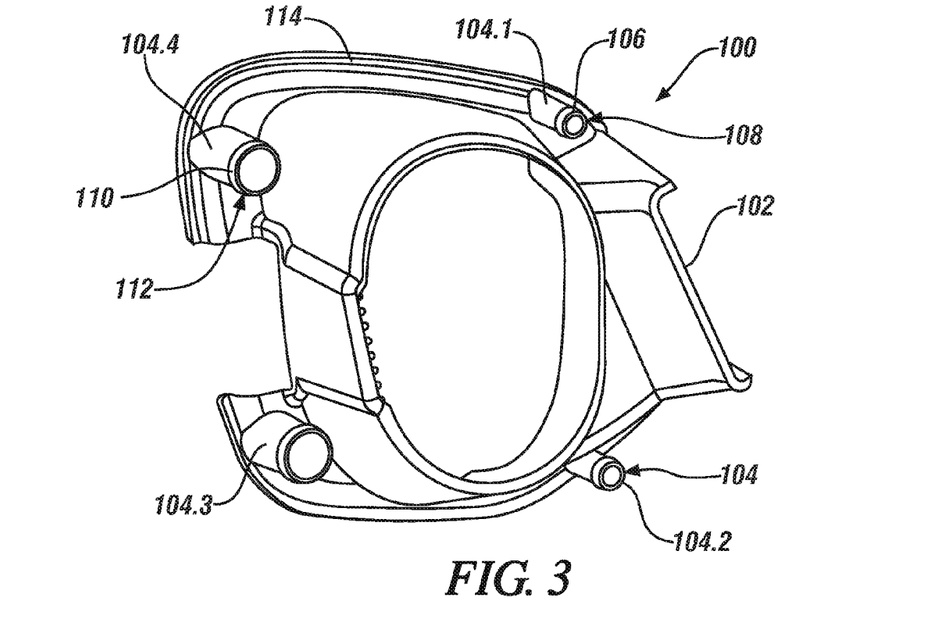
FIG. 3 depicts a bottom perspective of the first component of FIG. 2.
Figure 4:
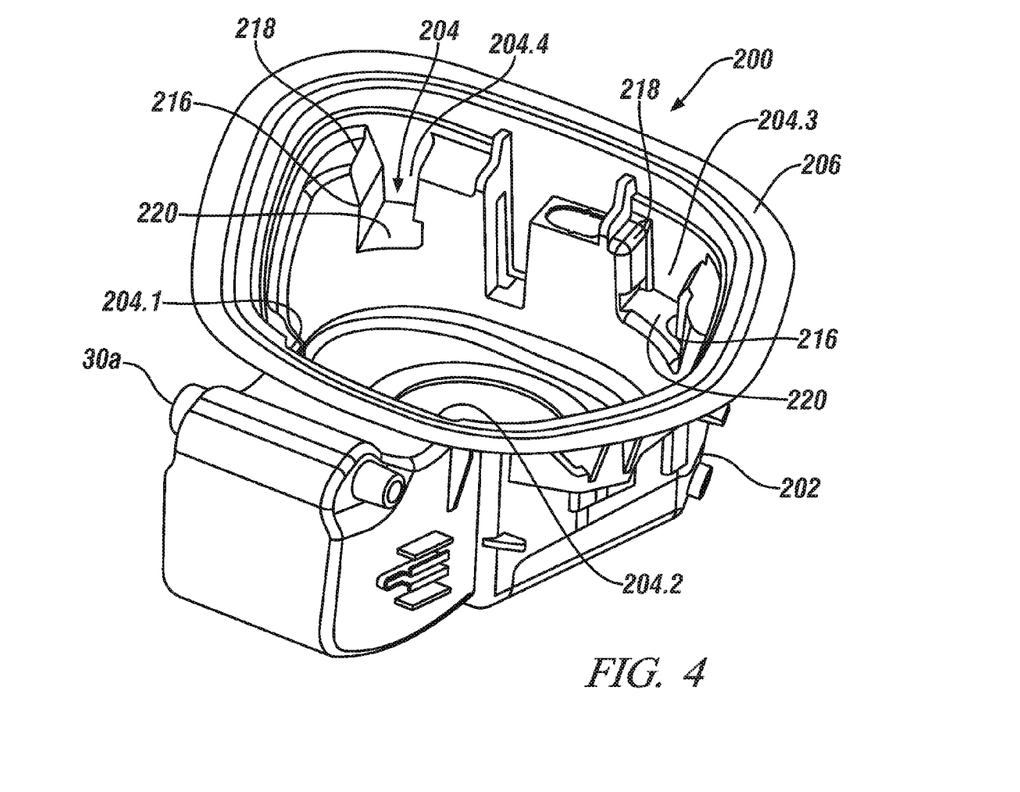
FIG. 4 depicts a top perspective view of a second component of the system of FIG. 1, in accordance with an embodiment of the invention.
Figure 5:
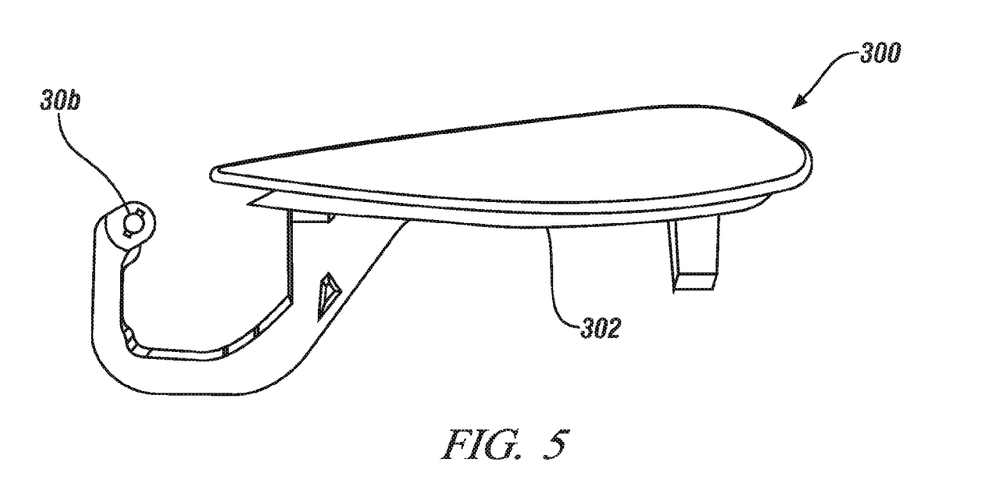
FIG. 5 depicts a side view of a third component of the system of FIG. 1, in accordance with an embodiment of the invention.

Reference is now made to FIGS. 1-5, where FIG. 1 depicts in block schematic form a side view of an elastically averaging alignment and retention system 10 for a sealable compartment, FIG. 2 depicts a side perspective view of a first component 100 of the system 10, FIG. 3 depicts a bottom perspective of the first component 100, FIG. 4 depicts a top perspective of a second component 200 of the system 10, and FIG. 5 depicts a side view of a third component 300 of the system 10. As depicted in FIG. 1, the block schematic representation of the third component 300 is illustrated in both a closed position 42 (solid lines) and an open position 40 (dashed lines).

In accordance with an exemplary embodiment of the invention, the elastically averaging alignment and retention system 10 for a sealable compartment 20 includes the first component 100 having a first alignment member 102 and a self-retaining elastically deformable alignment element 104 fixedly disposed with respect to the first alignment member 102. The elastically deformable alignment element 104 has the form of an elastically deformable elongated hollow tube (also herein referred to generally by reference numeral 104). The second component 200 has a second alignment member 202 and an alignment feature 204 (best seen with reference to FIG. 4) fixedly disposed with respect to the second alignment member 202. The alignment feature 204 has the form of a blind-end pocket (also herein referred to generally by reference numeral 204). As used herein, the term "blind-end pocket" means a pocket or feature that is closed, being absent any vents or through holes that would otherwise create a passage through the second component 200 in the area of the alignment feature 204. Respective ones of the elastically deformable alignment element 104 are configured and disposed to interferingly, deformably and matingly engage with corresponding ones of the alignment feature 204, in a manner discussed in more detail below. Portions of the elastically deformable alignment element 104 when inserted into the alignment feature 204 elastically deform to an elastically averaged final configuration that precisely aligns the first alignment member 102 with the second alignment member 202, and the first component 100 relative to the second component 200, in at least two of four planar orthogonal directions, such as the +/−x-direction and/or the +/−y-direction of an orthogonal coordinate system, for example, which is herein referred to as two-way alignment and four-way alignment, respectively. In an embodiment, the first component 100 is a first portion of a vehicle that forms a bezel insert of an electrical charge port, and the second component 200 is a second portion of the vehicle that forms a housing of the electrical charge port.

In an embodiment, the bezel insert (first component) 100 has a lip 114 (FIG. 3) that surrounds the sealable compartment 20, and the housing (second component) 200 has a flange 206 (FIG. 4) that surrounds the sealable compartment 20, where the lip 114 is disposed and configured to sealingly mate with the flange 206 when the first and second components 100, 200 are interferingly, deformably and matingly engaged with each other. The lip 114 and flange 206 have complementary shapes that cooperate to form a tight seal suitable for preventing intrusion of water, dust, debris, and other foreign substances from entering the sealed compartment 20.

In an embodiment, the system 10, further includes a third component 300 that is sealingly engagable with the second component 200 to form the sealable compartment 20, where the first component 100 is disposed between the second 200 and third 300 components and within the sealable compartment 20. In an embodiment, the third component 300 is movably coupled to the second component 200 via a hinge 30 (see FIG. 1), in the form of a hinge pin 30*a* (see FIG. 4) and hinge cam 30*b* (see FIG. 5). In an embodiment, the third component 300 provides a third portion of the vehicle that forms a cover of the electrical charge port. In an embodiment, which may be alternative to or in addition to the lip 114 described above, the cover (third component) 300 may include a lip 302 that surrounds the sealable compartment 20, where the lip 302 is disposed and configured to sealingly mate with the flange 206 when the first and second components 100, 200 are interferingly, deformably and matingly engaged with each other. The lip 302 and flange 206 have complementary shapes that cooperate to form a tight seal suitable for preventing intrusion of water, dust, debris, and other foreign substances from entering the sealed compartment 20.

In an embodiment, the first component 100 has four hollow tubes 104, herein generally referred to as first, second, third and fourth hollow tubes and individually referred to by reference numerals 104.1, 104.2, 104.3, 104.4 (see FIG. 3), and the second component 200 has four blind-end pockets 204, herein generally referred to as first, second, third and fourth blind-end pockets and individually referred to by reference numerals 204.1, 204.2, 204.3, 204.4 (see FIG. 4). The blind-end pockets 204.1, 204.2, 204.3, 204.4 are geometrically distributed so as to receive respective ones of the four hollow tubes 104.1, 104.2, 104.3, 104.4. In an embodiment, the first and second hollow tubes 104.1, 104.2 are smaller in diameter than the third and fourth hollow tubes 104.3, 104.4.

Figure 6:
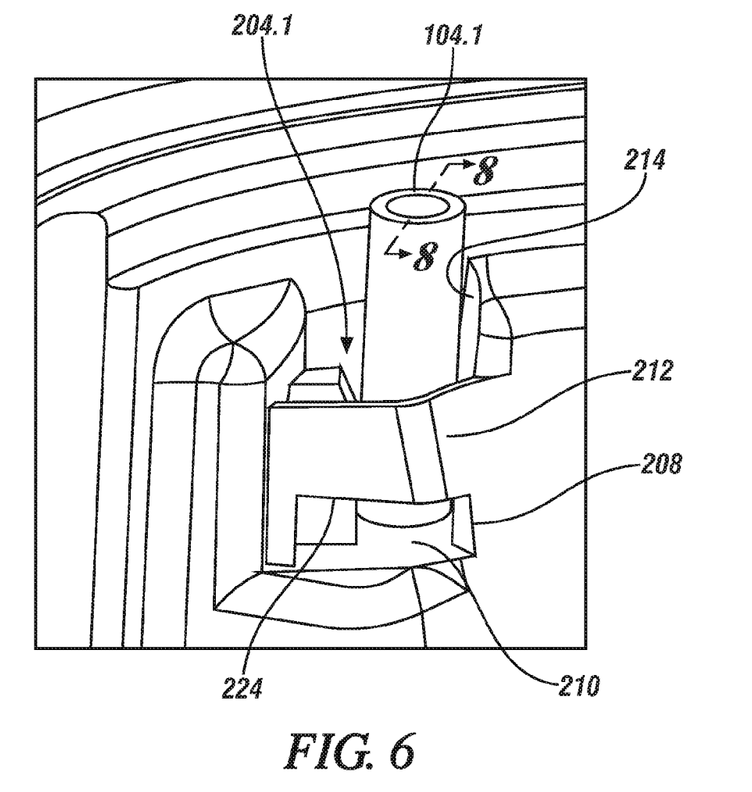
FIG. 6 depicts a perspective view of a pocket of the second component with a hollow tube of the first component engaged therein, but with the remainder of the first component removed for clarity, in accordance with an embodiment of the invention.

In an embodiment, and with reference now to FIG. 6 (depicting a perspective view of the first pocket 204.1 with the first hollow tube 104.1 engaged therein, and with the remainder of the first component 100 removed for clarity), each of the first and second pockets 204.1, 204.2 have an open-side portion 208 proximate the respective blind-end 210, and have a closed-side portion 212 that completely surrounds the respective pocket 204.1 in a region between an entry-end 214 and the open-side portion 208 of the respective pocket 204.1.

In an embodiment, and with reference now back to FIG. 4, each of the third and fourth pockets 204.3, 204.4 have a completely open-side 216 from an entry-end 218 to the blind-end 220 of the respective pocket 204.3, 204.4.

Figure 7:
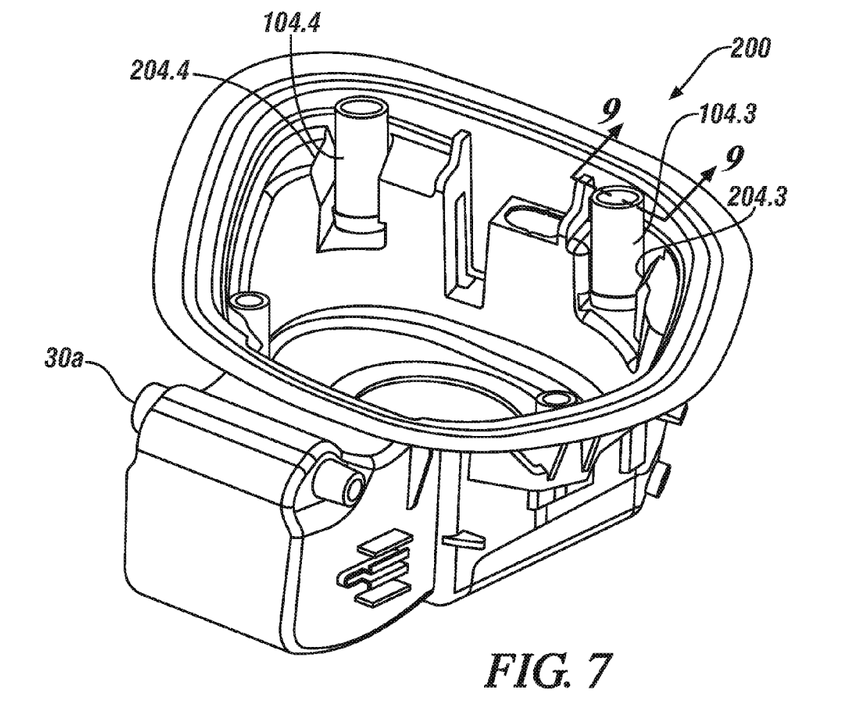
FIG. 7 depicts a perspective view of the second component showing two pockets with two respective hollow tubes of the first component engaged therein, but with the remainder of the first component removed for clarity, in accordance with an embodiment of the invention.

In an embodiment, the first and second hollow tubes 104.1, 104.2 are disposed to interferingly, deformably and matingly engage with respective ones of the first and second pockets 204.1, 204.2 (see FIG. 6 for example), and the third and fourth hollow tubes 104.3, 104.4 are disposed to interferingly, deformably and matingly engage with respective ones of the third and fourth pockets 204.3, 204.4 (see FIG. 7 for example, depicting a perspective view of the second component 200 showing the third and fourth pockets 204.3, 204.4 with the respective third and fourth hollow tubes 104.3, 104.4 engaged therein, and with the remainder of the first component 100 removed for clarity).

In an embodiment, the bezel insert 100 is removable for service, but stays in place when the cover 300 is opened 40 (depicted in FIG. 1 for example). When the cover 300 is closed 42 (also depicted in FIG. 1 for example), the compartment 20 is sealed.

Figure 8:
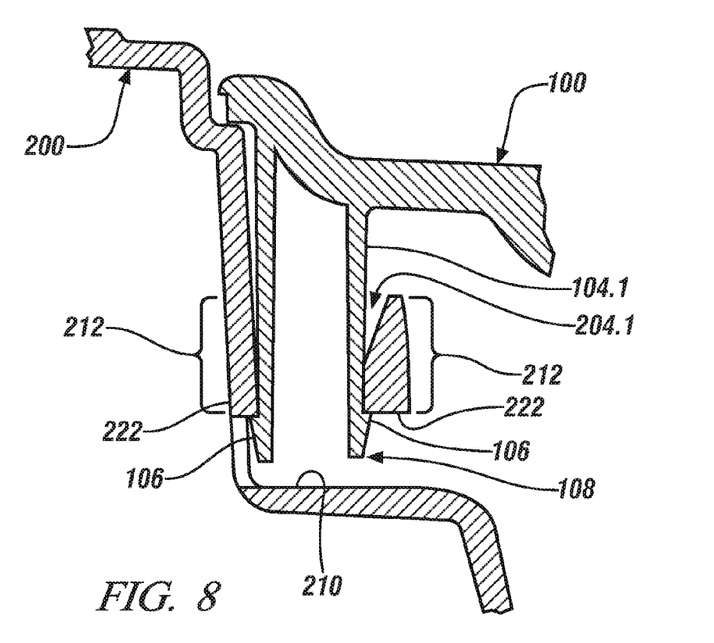
FIG. 8 depicts a section view through cut line 8-8 of FIG. 6 (with a top portion of the first element joined with the hollow tube), in accordance with an embodiment of the invention.

Reference is now made to FIG. 8 in combination with FIG. 3, where FIG. 8 depicts a section view through cut line 8-8 of FIG. 6 (with the top portion of the first element 100 joined with the hollow tube 104.1). In an embodiment, each of the first and second hollow tubes 104.1, 104.2 (FIG. 8 depicts just the first hollow tube 104.1 engaged with the first pocket 204.1, but it will be appreciated that the same description applies to the second hollow tube 104.2 and second pocket 204.2) has a retention element 106 in the form of a latch surface disposed at a distal end 108 of the hollow tube 104.1, and each of the first and second respective pockets 204.1, 204.2 has a retention feature 222 in the form of a catch surface formed at a bottom edge 224 (see FIG. 6) of the closed-side portion 212 proximate the blind-end 210 of the pocket 204.1. The retention element (latch surface) 106 of each the hollow tube 104.1, 104.2 is configured to interferingly, deformably and matingly, engage with the retention feature (catch surface) 222 of each respective pocket 204.1, 204.2, so that there is positive engagement between each retention element 106 and its respective retention feature 222. In an embodiment, and with reference to FIG. 3, the retention element (latch surface) 106 is a circular lip that circumscribes the distal end 108 of each of the first and second the hollow tubes 104.1, 104.2. However, it will be appreciated that the scope of the invention is not limited to only a circular lip, but also encompasses other configurations such as a lip disposed only at the point of engagement on the catch surface 222, for example.

Figure 9:
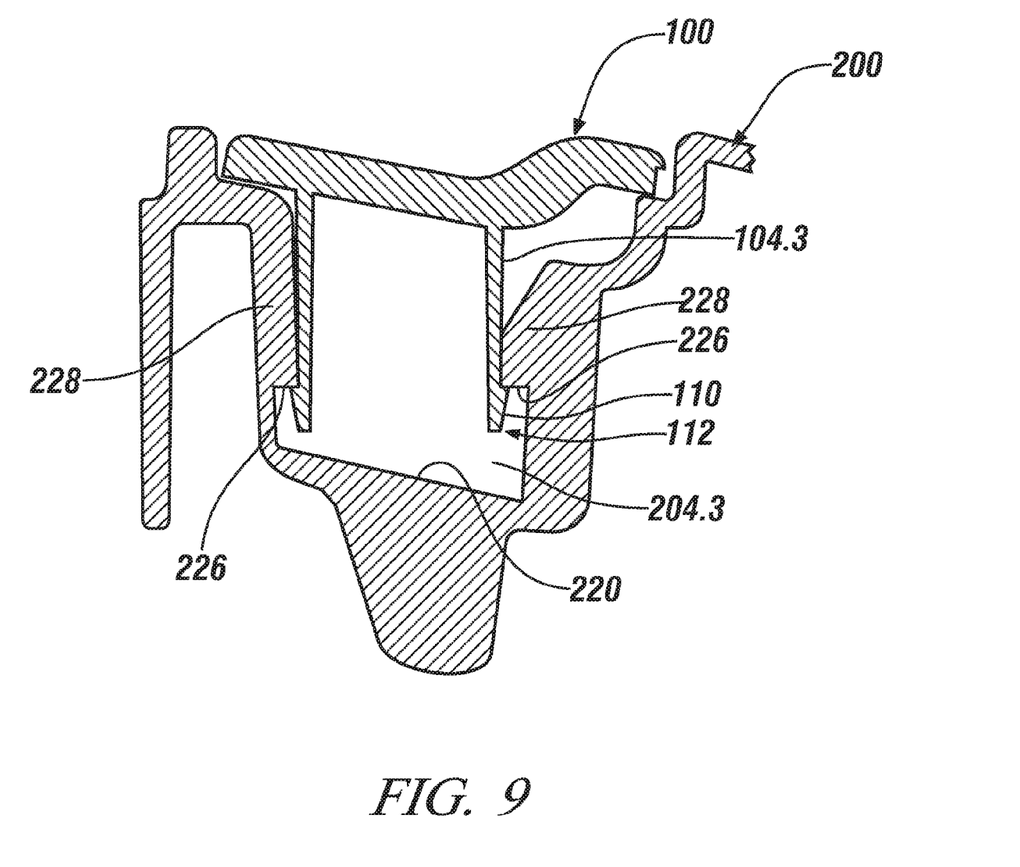
FIG. 9 depicts a section view through cut line 9-9 of FIG. 7 (with a top portion of the first element joined with the hollow tube), in accordance with an embodiment of the invention.

Reference is now made to FIG. 9, which depicts a section view through cut line 9-9 of FIG. 7 (with the top portion of the first element 100 joined with the hollow tube 104.3). In an embodiment, each of the third and fourth hollow tubes 104.3, 104.4 (FIG. 9 depicts just the third hollow tube 104.3 engaged with the third pocket 204.3, but it will be appreciated that the same description applies to the fourth hollow tube 104.4 and fourth pocket 204.4) has a retention element 110 in the form of a latch surface disposed at a distal end 112 of the hollow tube 104.3, and each of the third and fourth respective pockets 204.3, 204.4 has a retention feature 226 in the form of a catch surface formed in the side wall 228 of the pocket 204.3 proximate the blind-end 220 of the pocket 204.3. The retention element (latch surface) 110 of each of the hollow tube 104.3, 104.4 is configured to interferingly, deformably and matingly engage with the retention feature (catch surface) 226 of each respective pocket 204.3, 204.4, so that there is positive engagement between each retention element 110 and its respective retention feature 226. In an embodiment, and with reference to FIG. 3, the retention element (latch surface) 110 is a circular lip that circumscribes the distal end 112 of each of the first and second the hollow tubes 104.3, 104.4. However, it will be appreciated that the scope of the invention is not limited to only a circular lip, but also encompasses other configurations such as a lip disposed only at the point of engagement on the catch surface 226, for example.

With respect to the third and fourth blind-end pockets 204.3, 204.4, and in view of these pockets having an entry-end 218 and an open-side 216, it will be appreciated that each of the third 104.3 and fourth 104.4 hollow tubes is engagable with the respective pocket 204.3, 204.4 by insertion of the hollow tube into the entry-end 218 of the pocket, and by insertion of the hollow tube into the open-side 216 of the pocket, thereby allowing alternate approaches for assembling the first 100 and second 200 components together.

In accordance with an embodiment of the invention, the hollow tubes 104 and associated blind-end pockets 204 provide a self-retaining elastic averaging alignment system, herein described in the form of a bezel insert 100, that is self-retaining yet removable with respect to the housing 200.

While an embodiment of the invention has been herein described having a certain number of self-retaining alignment elements 104 and associated alignment features 204, it will be appreciated that the scope of the invention is not so limited and encompasses any number of such elements 104 and features 204 consistent with the invention disclosed herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaging alignment and retention system for a sealable compartment, comprising:
   a first component comprising a first alignment member and an elastically deformable alignment element fixedly disposed with respect to the first alignment member, the elastically deformable alignment element comprising an elongated elastically deformable alignment element;
   a second component comprising a second alignment member and an alignment feature fixedly disposed with respect to the second alignment member, the alignment feature comprising a closed alignment feature;
   wherein the elastically deformable alignment element is configured and disposed to interferingly, deformably and matingly engage the alignment feature; and
   wherein portions of the elastically deformable alignment element when inserted into the alignment feature elastically deform to an elastically averaged final configuration that aligns the first component relative to the second component in at least two of four planar orthogonal directions.

2. The elastically averaging alignment and retention system of claim 1, wherein:
   the elongated elastically deformable alignment element comprises a hollow tube; and
   the closed alignment feature comprises a blind-end pocket.

3. The elastically averaging alignment and retention system of claim 1, further comprising:
   a third component sealingly engagable with the second component to form the sealable compartment, the first component being disposed between the second and third components and within the sealable compartment.

4. The elastically averaging alignment and retention system of claim 2, wherein:
   the hollow tube comprises a retention element configured and disposed to engage with the pocket.

5. The elastically averaging alignment and retention system of claim 2, wherein:
   the blind-end pocket comprises a retention feature configured and disposed to engage with the elongated elastically deformable alignment element.

6. The elastically averaging alignment and retention system of claim 5, wherein:
   the hollow tube comprises a retention element configured and disposed to engage with the retention feature of the pocket.

7. The elastically averaging alignment and retention system of claim 6, wherein:
   the retention element comprises a latch surface disposed at a distal end of the hollow tube;
   the retention feature comprises a catch surface disposed proximate the blind-end of the pocket; and
   the latch surface is configured to engage the catch surface.

8. The elastically averaging alignment and retention system of claim 7, wherein:
   the pocket has a completely open-side from an entry-end to the blind-end of the pocket.

9. The elastically averaging alignment and retention system of claim 8, wherein:
   the hollow tube is engagable with the pocket by insertion of the hollow tube into the entry-end of the pocket, and by insertion of the hollow tube into the open-side of the pocket.

10. The elastically averaging alignment and retention system of claim 7, wherein:

the pocket has an open-side portion proximate the blind-end of the pocket, and has a closed-side portion that completely surrounds the pocket in a region between an entry-end and the open-side portion of the pocket.

11. The elastically averaging alignment and retention system of claim 1, wherein:

the first component comprises a first, a second, a third and a fourth of the elastically deformable alignment element comprising an elongated hollow tube, the first and second hollow tubes being smaller in diameter than the third and fourth hollow tubes;

the second component comprises a first, a second, a third and a fourth of the alignment feature comprising a blind-end pocket;

each of the first and second pockets have an open-side portion proximate the respective blind-end, and have a closed-side portion that completely surrounds the respective pocket in a region between an entry-end and the open-side portion of the respective pocket;

each of the third and fourth pockets have a completely open-side from an entry-end to the blind-end of the respective pocket;

the first and second hollow tubes are disposed to interferingly, deformably and matingly engage with respective ones of the first and second pockets; and the third and fourth hollow tubes are disposed to interferingly, deformably and matingly engage with respective ones of the third and fourth pockets.

12. The elastically averaging alignment and retention system of claim 11, further comprising:

a third component sealingly engagable with the second component to form the sealable compartment, the first component being disposed between the second and third components and within the sealable compartment; and wherein the third component is movably coupled to the second component via a hinge.

13. The elastically averaging alignment and retention system of claim 3, wherein:

the third component comprises a lip that surrounds the sealable compartment;

the second component comprises a flange that surrounds the sealable compartment; and the lip is disposed and configured to sealingly mate with the flange when the first and second components are interferingly, deformably and matingly engaged with each other.

14. The elastically averaging alignment and retention system of claim 3, wherein:

the first component comprises a first portion of a vehicle;

the second component comprises a second portion of the vehicle; and the third component comprises a third portion of the vehicle.

15. The elastically averaging alignment and retention system of claim 14, wherein:

the first portion of the vehicle is a bezel insert of a charge port;

the second portion of the vehicle is a housing of the charge port; and the third portion of the vehicle is a cover of the charge port.

\* \* \* \* \*